(12) United States Patent
Akashi et al.

(10) Patent No.: US 9,845,087 B2
(45) Date of Patent: Dec. 19, 2017

(54) VEHICLE CONTROL APPARATUS

(71) Applicant: Mitsubishi Electric Corporation, Chiyoda-ku, Tokyo (JP)

(72) Inventors: Yohei Akashi, Chiyoda-ku (JP); Hideyuki Tanaka, Chiyoda-ku (JP); Hiroyuki Saito, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 54 days.

(21) Appl. No.: 14/295,488

(22) Filed: Jun. 4, 2014

(65) Prior Publication Data

US 2015/0088349 A1 Mar. 26, 2015

(30) Foreign Application Priority Data

Sep. 20, 2013 (JP) .................................. 2013-194843

(51) Int. Cl.
*B60W 10/10* (2012.01)
*B60W 10/08* (2006.01)
(Continued)

(52) U.S. Cl.
CPC ............ *B60W 10/10* (2013.01); *B60W 10/06* (2013.01); *B60W 10/08* (2013.01); *B60W 10/11* (2013.01);
(Continued)

(58) Field of Classification Search
CPC .... B60W 10/00; B60W 10/02; B60W 10/023; B60W 10/026; B60W 10/04; B60W 10/06; B60W 10/08; B60W 10/10; B60W 20/00; B60W 20/10; B60W 20/102; B60W 20/104; B60W 20/106; B60W 20/1062;
(Continued)

(56) References Cited

U.S. PATENT DOCUMENTS 8,483,949 B2 * 7/2013 Taguchi et al. ............... 701/411
8,584,824 B2 * 11/2013 Eriksson et al. ............... 192/50
(Continued)

FOREIGN PATENT DOCUMENTS

JP 11311318 A 11/1999
JP 2000-205395 A 7/2000
(Continued)

OTHER PUBLICATIONS

Communication dated Sep. 2, 2014, issued by the Japanese Patent Office in counterpart Japanese application No. 2013-194843.
(Continued)

*Primary Examiner* — Jerrah Edwards
(74) *Attorney, Agent, or Firm* — Sughrue Mion, PLLC; Richard C. Turner

(57) ABSTRACT

An object is to provide a vehicle control apparatus capable of enhancing fuel economy when coasting is performed by disconnecting a clutch disposed between an engine and drive wheels of the vehicle. A travel path and a travel pattern of a vehicle are predicted by a vehicle outside information collection device, such as a navigation system. Also, amounts of fuel consumption by normal traveling and coasting are predicted and compared, so that coasting control is performed in a case where an amount of fuel consumption can be reduced by performing the coasting control.

7 Claims, 3 Drawing Sheets

(51) Int. Cl.
  *F16H 59/74* (2006.01)
  *B60W 10/06* (2006.01)
  *B60W 10/11* (2012.01)
  *B60W 10/30* (2006.01)
  *B60W 30/18* (2012.01)
  *B60W 50/14* (2012.01)

(52) U.S. Cl.
  CPC ...... *B60W 10/30* (2013.01); *B60W 30/18072* (2013.01); *F16H 59/74* (2013.01); *B60W 2030/1809* (2013.01); *B60W 2050/143* (2013.01); *B60W 2550/143* (2013.01); *B60W 2550/402* (2013.01); *Y02T 10/52* (2013.01); *Y10S 903/93* (2013.01)

(58) Field of Classification Search
  CPC ........... B60W 20/108; B60W 20/1082; B60W 20/1084; B60W 20/1086; B60W 20/1088; B60W 20/20; B60W 20/30; B60W 20/40; B60W 20/50; B60W 30/18072; B60W 30/182; B60W 2550/14; B60W 2550/141; B60W 2550/142; B60W 2550/143; B60W 2550/145; B60W 2550/146; B60W 2550/147; B60W 2550/148; B60W 2550/16; B60W 2550/20; B60W 2550/22; B60W 2550/30; B60W 2550/302; B60W 2550/304; B60W 2550/306; B60W 2550/308; B60W 2550/40; B60W 2550/402; B60W 2550/404; B60W 2550/406; B60W 2550/408; B60W 2510/0647; B60W 2710/0655; B60W 2750/40; F16H 59/74; F16H 59/743; F16H 2059/186; F16H 2061/0015; F16D 2500/5085
  See application file for complete search history.

(56) References Cited

U.S. PATENT DOCUMENTS

2010/0262408 A1* 10/2010 Taguchi et al. .................. 703/8
2012/0065852 A1* 3/2012 Eriksson et al. ................ 701/54

FOREIGN PATENT DOCUMENTS

| JP | 2009-108981 A | 5/2009 |
| JP | 2010-112502 A | 5/2010 |
| JP | 2011-183963 A | 9/2011 |
| JP | 2012-117473 A | 6/2012 |
| JP | 2012-214181 A | 11/2012 |
| JP | 2013-001282 A | 1/2013 |

OTHER PUBLICATIONS

Communication dated Dec. 2, 2014, issued by the Japanese Patent Office in counterpart Application No. 2013194843.
Communication dated Jan. 18, 2017, from the German Patent and Trademark Office in counterpart German application No. 10 2014 216 983.6.

* cited by examiner

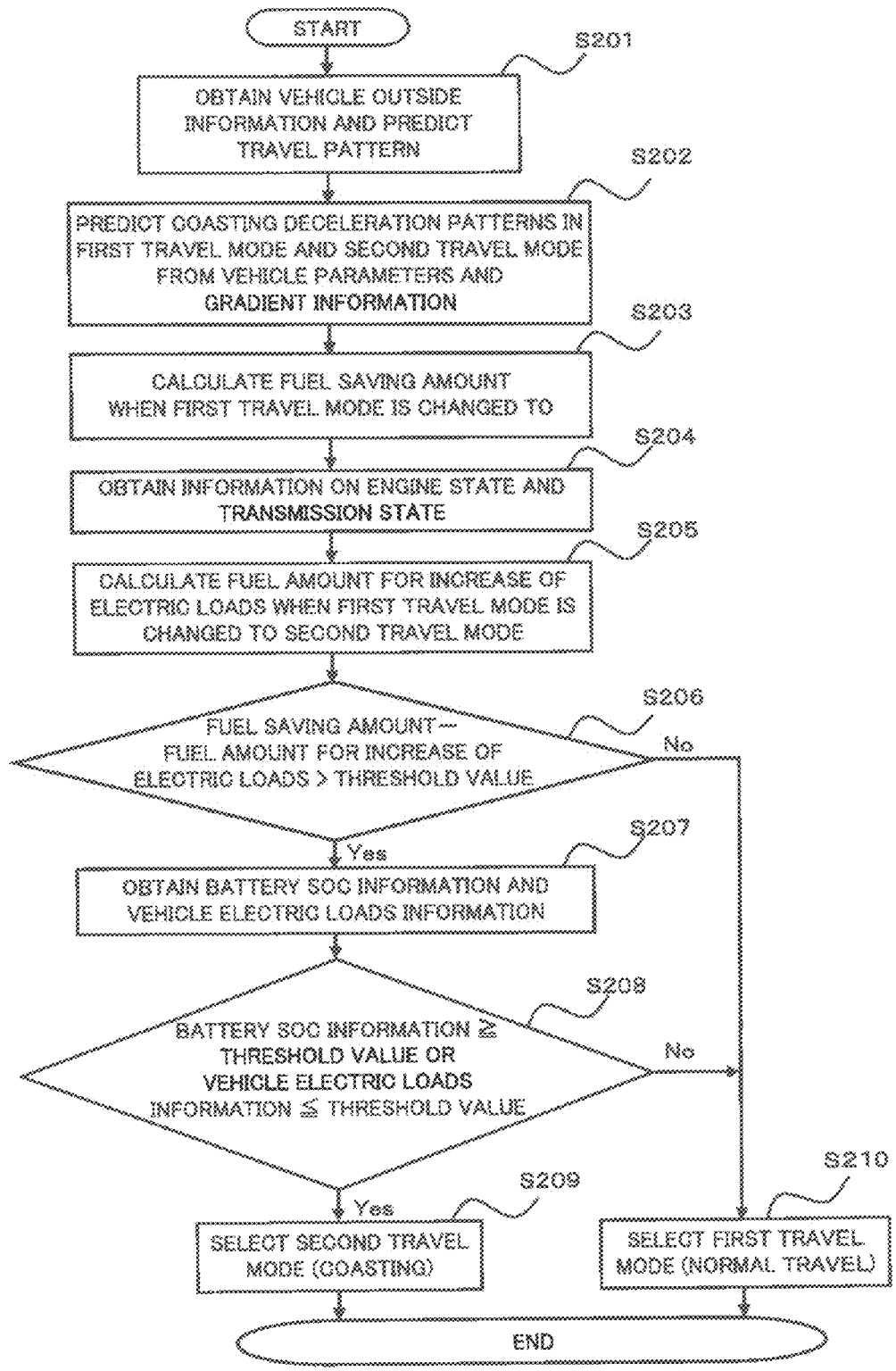

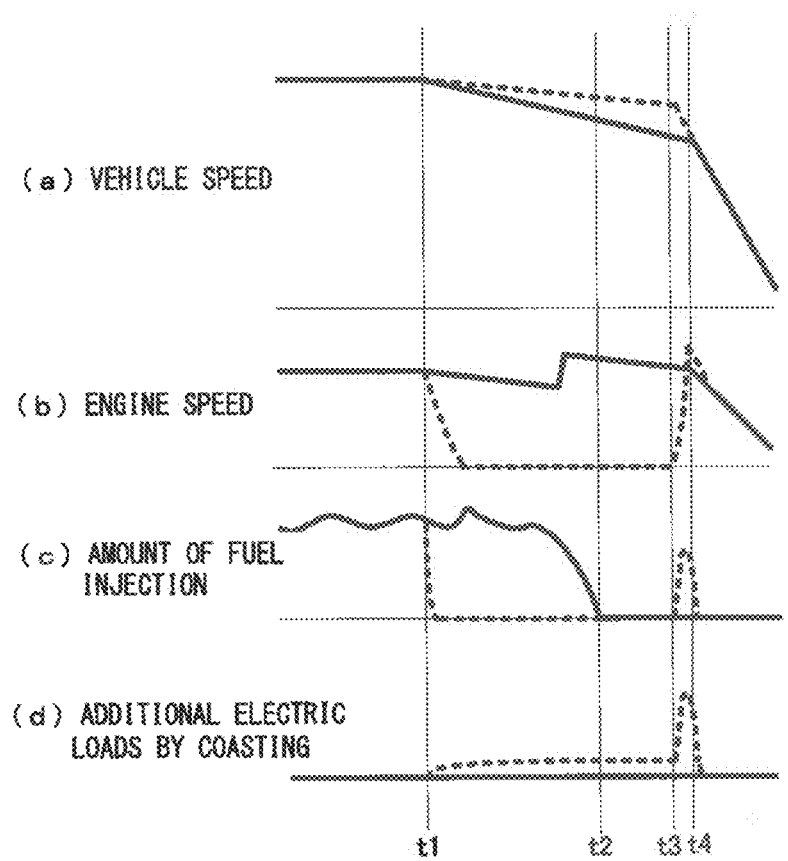

VEHICLE CONTROL APPARATUS

BACKGROUND OF THE INVENTION

Field of the Invention

The present invention relates to a vehicle control apparatus aimed at enhancing fuel economy of a vehicle.

Description of the Background Art

Recently, a technique is being developed as a measure taken to enhance fuel economy of an engine-equipped vehicle, according to which coasting is performed by disconnecting a clutch disposed between the engine and drive wheels while the vehicle is moving, so that fuel economy is enhanced by lessening engine drag.

Under the coasting control as above, fuel economy is enhanced by securing a longest possible coasting time. Hence, enhancement of fuel economy depends on determination conditions under which to perform the coasting.

For example, Patent Document 1 discloses that a determination is made so as to select control under which less fuel is consumed depending on whether the coasting control is performed or not when a vehicle is run in a predetermined speed range.

Also, Patent Document 2 discloses that whether or not to perform the coasting is determined while securing a distance long enough to stop the vehicle safely according an inter-vehicle distance and a relative speed with respect to a vehicle in front.

[Patent Document 1] JP-A-2011-183963

[Patent Document 2] JP-A-2012-214181

According to Patent Document 1, however, when the control is switched back from the coasting control, it is necessary to start the engine. Nevertheless, power consumed by a starter used at the engine start is not taken into consideration in this system. Therefore, an effort can still be made for further enhancement of fuel economy.

Also, according to Patent Document 2, a predetermined time is necessary to connect the clutch by starting the engine when the control is switched back from the coasting control. Hence, because it can by no means be said that engine braking is used to secure a braking force, performing the coasting control according to an inter-vehicle distance is meaningless. Therefore, a more effort can be made for enhancement of fuel economy.

SUMMARY OF THE INVENTION

The invention was devised to solve the problems as discussed above and has en object to provide a vehicle control apparatus capable of enhancing fuel economy optimally by coasting control.

A vehicle control apparatus according to one aspect of the invention includes: an engine as a drive source of a vehicle; a motive power transmission device that transmits motive power between the engine and the self to drive wheels of the vehicle; a vehicle outside information collection device that determines a travel path the vehicle is traveling and predicts a travel path and a travel pattern obtained from the determined travel path while obtaining road information of the predicted travel path; and a control device that makes a switching between a first travel mode in which the motive power of the engine is transmitted to the drive wheels by setting the motive power transmission device in a connected state, and a second travel mode in which the motive power of the engine is not transmitted to the drive wheels by setting the motive power transmission device in an open state.

The control device predicts an amount of fuel consumption when the first travel mode is selected and an amount of fuel consumption when the second travel mode is selected according to a vehicle speed pattern predicted from the travel path and the road information, and makes a switching to one of the travel modes in which the predicted amount of fuel consumption is the smaller by comparing the predicted amounts of fuel consumption.

According to the invention, fuel economy can be enhanced by predicting amounts of fuel consumption from a travel path and a vehicle speed pattern of the vehicle and travel road information and by performing the coasting control in a case where an amount of fuel consumption can be reduced by performing the coasting control in consideration of power of a starter necessary when the control is switched back from the coasting control.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 2 is a flowchart depicting an operation of the vehicle control apparatus according to the first embodiment of the invention; and FIG. 3 is a time chart showing an operation state of the vehicle control apparatus according to the first embodiment of the invention.

DETAILED DESCRIPTION OF THE PREFERRED EMBODIMENT

First Embodiment

Figure 1:
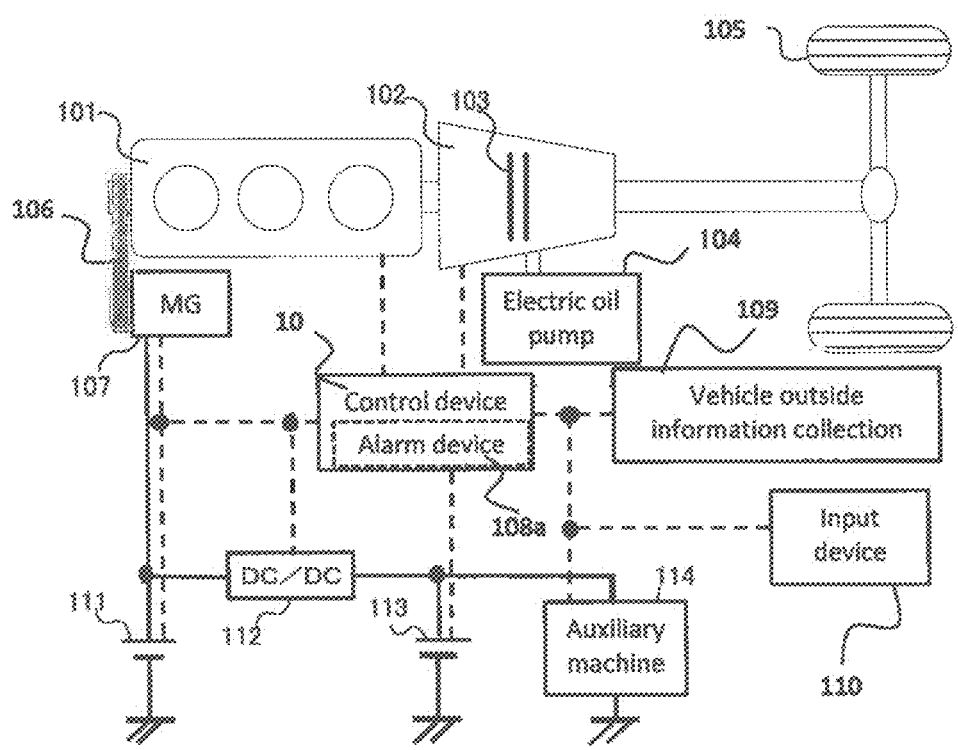
FIG. 1 is a view schematically showing a configuration of a vehicle control apparatus according to a first embodiment of the invention.

Hereinafter, a detailed description will be given according to the drawings showing an embodiment of the invention.

FIG. 1 is a view schematically showing a configuration of a major portion of a vehicle control apparatus according to a first embodiment of the invention.

Referring to the drawing, an engine 101, which is a drive source of the vehicle, is connected to a transmission 102 so as to drive drive wheels 105 via a clutch 103 installed inside the transmission 102. Oil is supplied into the transmission 102 by an electric oil pump 104 so that the transmission 102 operates smoothly.

Also, a motor generator 107 is connected to the engine 101 via a belt 106 and generates power in association with rotations of the engine 101. The respective devices supply a control device 108 with information indicating their own operation states and the operation states are controlled according to outputs of the control device 108. Further, the control device 108 receives inputs, such as information from a vehicle outside information collection device 109, such as a navigation system, and vehicle operation information from an input device 110, such as an accelerator and a brake.

Power generated by the motor generator 107 in association with rotations of the engine 101 is supplied to a high-voltage storage device 111 rated, for example, at 48 Volts or 24 Volts and charged therein and is also supplied to a low-voltage storage device 113 rated, for example, at 12 Volts via a step-down DC-to-DC converter 112 and charged therein. An output of the low-voltage storage device 113 is supplied to auxiliary machines 114, such as a starter and an alternator, to drive the respective machines. The storage devices 111 and 113 internally manage an SOC (State of Charge) indicating a charging state. The SOC information is also supplied to the control device 108 and used for a determination of coasting control.

An operation in a case where the coasting control is performed by the vehicle control apparatus as above will now be described.

The coasting control is basically performed in a case where it is recognized that the vehicle is in a state in which acceleration by the driver's operation on the accelerator or the brake is not necessary.

Accordingly, under the coasting control, the drive source and the wheels are completely disconnected by opening the clutch 103 within the transmission 102 between the engine 101, which is the drive source of the vehicle, and the drive wheels 105 of the vehicle. Hence, under the coasting control, the vehicle is merely a body of inertia except for a mechanical loss included between the clutch 103 and the drive wheels 105 and decelerates only by a travel resistance component required for the traveling.

The travel resistance referred to herein means a rolling resistance Rr [N] (N represents Newtons), an air resistance Ra [N], and a gradient resistance Rg [N]. The rolling resistance Rr [N] means a friction generated between a tire and a road surface and is therefore found in accordance with Equation (1) below according to a weight of the vehicle (hereinafter, referred to as the vehicle weight) W [N], characteristics of the tire, and road surface conditions. Also, the air resistance Ra [N] is found in accordance with Equation (2) below according to a frontal projection area A [m$^2$] of the vehicle, an air resistance coefficient Cd, and a vehicle speed V [m/s]. Further, the gradient resistance Rg [N] is found in accordance with Equation (3) below according to the vehicle weight W [N] and a gradient θ of the road surface.

$$Rr = \mu r \cdot W \quad (1)$$

$$Ra = (\rho/2) \cdot Cd \cdot A \cdot V^2 \quad (2)$$

$$Rg = W \cdot \sin \theta \quad (3)$$

Where μr is a rolling resistance coefficient between the tire and the road surface and ρ is an air density (Kg/m$^3$).

Values of these travel resistances can be found on the basis of information on vehicle parameters inputted in advance and information from the vehicle outside information collection device 109, such as a navigation system.

More specifically, the rolling resistance Rr can be calculated using the vehicle weight W, which is one of the vehicle parameters, the characteristics of the tire, and the road surface conditions obtained by the vehicle outside information collection device 109. The air resistance Ra can be calculated using the frontal projection area A of the vehicle, which is a vehicle parameter, the air resistance coefficient Cd, and a vehicle speed. V. The air resistance Ra may be corrected by correcting a vehicle speed according to a wind speed and a direction of the wind obtained by the vehicle outside information collection device 109. A correction can be made by adding a wind speed of a component opposite to a travelling direction of the vehicle to the vehicle speed as a positive value.

Also, the gradient resistance Rg is determined by the vehicle weight W, which is a vehicle parameter, and a gradient of the road surface obtained by the vehicle outside information collection device 109. The vehicle weight W can be a vehicle parameter inputted in advice. Alternatively, a learning function of calculating the vehicle weight W according to a speed pattern of coasting deceleration at a 0-gradient point may be provided.

Deceleration a1 [m/s$^2$] of the coasting deceleration of the vehicle can be found by dividing the travel resistances found as above by the vehicle weight W.

Regarding deceleration a2 [m/s$^2$] under normal control in a case where the clutch 103 between the engine 101 and the vehicle drive wheels 105 is connected, engine braking Beg [N] is added in addition to the travel resistances. The engine braking may have a value that can vary with an engine speed.

$$a1 = (Rr + Ra + Rg)/W \quad (4)$$

$$a2 = (Rr + Ra + Rg + Beg)/W \quad (5)$$

Under the coasting control, the engine 101 may be maintained at an idle speed or the engine 101 may be stopped. It should be noted that the following problems occur once the engine 101 is stopped.

(1) The motor generator 107 cannot generate power because the engine 101 is stopped and there is no drive source.

(2) Lubricant oil inside the transmission 102 can no longer be secured when the engine 101 is stopped because lubricant oil is secured by rotations of the engine 101.

(3) A negative pressure used in a brake booster can no longer be secured once the engine 101 is stopped because the booster uses a negative pressure generated in an intake manifold of the engine 101.

(4) It becomes necessary to drive the starter or the motor generator to re-start the engine 101.

Measures taken for these problems are as follows.

(1) The engine 101 is not stopped in a case where the SOC information of the battery cannot secure a certain amount or above due to the incapability of power generation.

(2) The electric oil pump 104 is driven while the engine 101 is stopped so as to secure a lubricant oil pressure in the transmission 102 (this is a measure equivalent to the one taken for an idle-stop vehicle).

(3) Because a negative pressure used in the brake booster is not lost as soon as the engine 101 is stopped, a measure is not necessarily taken. However, in a case where it is desirable to secure redundancy, it becomes necessary to take a measure by providing an electric negative pressure pump.

(4) It becomes necessary to provide drive power for the starter or the motor generator to re-start the engine 101.

A specific operation of the vehicle control apparatus of the first embodiment will now be described according to the flowchart of FIG. 2.

Referring to FIG. 2, a travel path the vehicle is traveling is determined first in Step S201 by a navigation system or the like included in the vehicle outside information collection device 109. Also, road information, such as curves, gradients, and traffic jam information, of a travel path predicted by the vehicle outside information collection device 109, such as the navigation system and an ultrasonic sensor, is obtained. A vehicle speed pattern is predicted from the information on the travel path, the curves, and the gradients, as well as tendency of normal operation speed of the driver.

In other words, the vehicle speed is limited on a steep slope, at a curve with a small radius of rotation, and by jamming state. Moreover, a preferable vehicle speed varies from driver to driver. The vehicle speed pattern can be predicted on the basis of the foregoing factors.

Subsequently in Step S202, coasting deceleration patterns in a case where the vehicle travels by selecting a first travel mode, which is a normal travel mode, and in a case where the vehicle travels by selecting a second travel mode, which is a coasting mode, are predicted from the road information, such as gradients of the travel path and the pre-set vehicle parameters.

Further in Step S203, amounts of used fuel are predicted for the case where the vehicle travels in the first travel mode and the case where the vehicle travels in second travel mode, a fuel saving amount under the coasting control is calculated by subtracting an amount of used fuel in the second travel mode from an amount of used fuel in the first travel mode.

Subsequently in Step S204, information on the operation state of the engine 101 and the operation state of the transmission 102 is obtained. Further in Step S205, a fuel amount Fel for an increase of electric loads of the auxiliary machines 114, which is an increase when the second travel mode is performed, is calculated in accordance with Equation (6) below.

An increase of electric loads when the coasting control is performed means an output Eop of the electric oil pump 104 that maintains a hydraulic pressure in the transmission 102, which is the problem occurring when the engine 101 is stopped as described above, an output Evp of an electric vacuum pump that generates a negative pressure used in the brake booster or the like, and an output Est of the starter or the motor generator 107 operated to re-start the engine 101 when the coasting is cancelled. A hydraulic pressure needed by the transmission 102 becomes lower as the transmission 102 rotates at a lower speed and becomes higher as the transmission 102 rotates at a higher speed. Hence, a required output of the electric oil pump 104 is changed according to the rotation speed of the transmission 102. Likewise, an output of the starter or the motor generator 107 necessary at a re-start becomes small when the engine 101 operates in a warm-up operation state, a high water temperature state, or a high oil temperature state and becomes large when the engine 101 operates in a cool-down operation state, a low water temperature state, or a low oil temperature state. Hence, required power is changed according to an operation state amount of the engine 101. The fuel amount Fel for an increase of electric loads can be calculated by dividing an increase of electric loads by an efficiency ealt of the alternator or the motor generator 107 and an engine efficiency eeg.

$$Fel=(Eop+Evp+Est)/\epsilon alt/\epsilon eg \quad (6)$$

It is then determined in Step S206 that there is no fuel economy enhancement effect by the coasting control when the value of a difference obtained by subtracting the fuel amount for an increase of electric loads from the fuel saving amount is below a threshold value, and the first travel mode (normal travel) in Step S210 is selected.

In a case where it is found in Step S206 that the value of a difference obtained by subtracting the fuel amount for an increase of electric loads from the fuel saving amount exceeds the threshold value, advancement is made to Step S207 in which the SOC information of the battery and electric loads information, of the vehicle are obtained.

Subsequently, in a case where it is found in Step S208 that the SOC information of the battery is equal to or lower than a threshold value or the vehicle electric loads are equal to or higher than a threshold value, because power of the electric loads cannot be supplied under the coasting control, the first travel mode (normal travel) in Step S210 is selected on the ground that a storage amount sufficient for the coasting control cannot be secured.

Also, in a case where it is found in Step S208 that the SOC information of the battery is equal or higher than the threshold value or the vehicle electric loads are equal to or lower than the threshold value, the coasting control is performed by selecting the second travel mode on the ground that a storage amount sufficient for the coasting control has been secured and it has been determined in Step S206 that the fuel economy enhancement effect by the coasting control can be obtained.

The above has described a configuration in which when the control device 108 determines that fuel economy is better under the coasting control than under the normal travel control, the coasting control is performed by automatically disconnecting the clutch 103 on the vehicle side. However, it may be configured in such a manner that an alarm device 108a displaying that the fuel economy enhancement effect can be obtained is provided, so that the alarm device 108a informs the driver that switching to the coasting control is preferable.

An operation of the vehicle control apparatus of the invention will now be described according to FIG. 3 showing a time chart. In the drawing, solid lines indicate a case of the first travel mode, which the normal travel mode during which the clutch 103 is connected, and dotted lines indicate a case of the second travel mode, which is the coasting mode during which the clutch 103 is opened.

In a case where it is confirmed that the vehicle is in a travel state in which acceleration by the driver's operation on the accelerator or the brake is not necessary, a determination as to whether or not to perform the coasting control is started at a time t1.

It is known that a target vehicle speed has a speed width of ±2 km/h or so in a mode travel that determines fuel economy of the vehicle. Assume that a predicted speed pattern has a speed width of ±2 km/h or so also in this control. It is a precondition of this control that respective coasting patterns in the first travel mode and the second travel mode fall within the speed width of the vehicle speed pattern.

Regarding an amount of fuel injection, it is necessary in the first travel mode to inject fuel unless a fuel cut condition is satisfied, whereas fuel is not injected in the second travel move because the engine 101 is stopped (from times t1 to t2). Conversely, it is necessary in the second travel mode to inject fuel at a re-start of the engine 101 when the coasting is cancelled (from times t3 to t4). A fuel saving amount by the coasting control can be found by subtracting an amount of fuel injection in the second travel mode from an amount of fuel injection in the first travel mode.

In other words, in the chart C of FIG. 3, amounts of fuel injection in the first travel mode and the second travel mode can be predicted by accumulating total amounts of fuel injection of the solid line and the dotted line from the t1 to t4 and hence an expected fuel saving amount can be found from the predicted amounts.

Additional electric loads by the coasting are, as has been described above, a sum of power of the electric pump 104 and the electric vacuum pump (same as the electric negative pressure pump) while the engine 101 is stopped (from times t1 to t3) and power of the starter or the motor generator 107 necessary at a re-start of the engine 101 (from times t3 to t4).

A fuel amount for an increase of electric loads is calculated by dividing an increase of electric loads by efficiency of the alternator or the motor generator 107 and efficiency of the engine 101. In a case where the value of a difference obtained by subtracting the fuel amount for an increase of electric loads from the fuel saving amount takes a positive value, the coasting control is selected because there is a fuel economy enhancement effect by the coasting control.

As has been described, according to the first embodiment of the invention, the vehicle control apparatus has the vehicle outside information collection device 109, such as a navigation system, and an amount of fuel consumption is predicted from a travel path and a speed pattern of the vehicle and travel road information, so that a fuel economy can be enhanced by performing the coasting control in a case where an amount of fuel consumption is reduced in a reliable manner by performing the coasting control in consideration of power of the electric oil pump during the coasting and power of the starter necessary when the operation is switched back from the coasting.

The first embodiment has described a case where it is a precondition to use the 48-Volt motor generator 107 using the belt 106. It should be appreciated, however, that the invention is also applicable to a non-hybrid vehicle equipped with a motor generator sandwiching a transmission or a hybrid vehicle capable of traveling by disconnecting the engine without depending on a voltage from 12 Volts to as high as 300 Volts or higher, and the fuel economy enhancement effect can be obtained as well.

The first embodiment has described a case where it is a precondition that the engine 101 maintains an idle speed or the engine 101 is stopped during the coasting. It should be appreciated, however, that the same effect can be obtained by performing idle coasting by which an idle speed of the engine 101 is maintained during the coasting. It should be noted, however, that the effect is lessened in comparison with a case where the engine 101 is stopped because the engine 101 requires fuel to maintain an idle speed.

Same reference numerals denote same or equivalent portions in the respective drawings.

It should be understood that the embodiment of the invention can be modified or omitted as the need arises within the scope of the invention.

Various modifications and alterations of this invention will be apparent to those skilled in the art without departing from the scope and spirit of this invention, and it should understood that this is not limited to the illustrative embodiments set forth herein.

What is claimed is:

1. A vehicle control apparatus, comprising:
an engine as a drive source of a vehicle;
a transmission that transmits power from the engine to drive wheels of the vehicle;
a vehicle outside information collection device that determines a travel path the vehicle is traveling and predicts a travel path and a vehicle speed pattern from the determined travel path, while obtaining road information of the predicted travel path; and
a control device that switches between a first travel mode in which the motive power of the engine is transmitted to the drive wheels by setting the transmission in a connected state, and a second travel mode in which the power of the engine is not transmitted to the drive wheels by setting the transmission in an open state,
wherein the control device predicts an amount of fuel consumption for the first travel mode and an amount of fuel consumption for the second travel mode according to the vehicle speed pattern predicted from the predicted travel path and the road information and compares the predicted amounts of fuel consumption to determine a difference between the predicted amounts of fuel consumption,
wherein if the difference between the predicted amounts of fuel consumption does not exceed a first threshold value, the control device selects the first travel mode, and
wherein if a current travel mode is different from the selected travel mode, the control device switches from the current travel mode to the selected travel mode.

2. The vehicle control apparatus according to claim 1, further comprising:
an auxiliary machine that uses a required amount of electricity when a switching is made between the first travel mode and the second travel mode as power,
wherein if the difference between the predicted amounts of fuel consumption exceeds the first threshold value, the control device compares the required amount of electricity to a second threshold value,
wherein if the required amount of electricity exceeds the second threshold value, the control device selects the first travel mode, and
wherein if the required amount of electricity does not exceed the second threshold value, the control device selects the second travel mode.

3. The vehicle control apparatus according to claim 1, further comprising:
a storage device that stores power generated in association with rotations of the engine,
wherein if the difference between the predicted amounts of fuel consumption exceeds the first threshold value, the control device compares a storage state of the storing device to a third threshold value,
wherein if the storage state of the storing device does not exceed the third threshold value, the control device selects the first travel mode, and
wherein if the storage state of the storing device exceeds third threshold value, the control device selects the second travel mode.

4. The vehicle control apparatus according to claim 1, wherein:
the predicted amount of fuel consumption for the second travel mode is calculated according to an operation state of the engine.

5. The vehicle control apparatus according to claim 3, wherein:
the predicted amount of fuel consumption for the second travel mode is calculated according to an operation state of the engine.

6. A vehicle control apparatus, comprising:
an engine as a drive source of a vehicle;
a transmission that transmits power from the engine to drive wheels of the vehicle;
a vehicle outside information collection device that determines a travel path the vehicle is traveling and predicts a travel path and a vehicle speed pattern from the determined travel path, while obtaining road information of the predicted travel path;
a storage device that stores power generated in association with rotations of the engine; and
a control device that switches between a first travel mode in which the motive power of the engine is transmitted to the drive wheels by setting the transmission in a connected state, and a second travel mode in which the power of the engine is not transmitted to the drive wheels by setting the transmission in an open state, wherein the control device predicts an amount of fuel consumption for the first travel mode and an amount of fuel consumption for the second travel mode according to the vehicle speed pattern predicted from the predicted travel path and the road information, compares the predicted amounts of fuel consumption, and, if a storage state of the storing device exceeds a first threshold value, switches to the travel mode having the smaller predicted amount of fuel consumption among the travel modes.

7. A vehicle control apparatus, comprising:

an engine as a drive source of a vehicle;

a transmission that transmits power from the engine to drive wheels of the vehicle;

a vehicle outside information collection device that determines a travel path the vehicle is traveling and predicts a travel path and a vehicle speed pattern from the determined travel path, while obtaining road information of the predicted travel path;

a control device that switches between a first travel mode in which the motive power of the engine is transmitted to the drive wheels by setting the transmission in a connected state, and a second travel mode in which the power of the engine is not transmitted to the drive wheels by setting the transmission in an open state; and an alarm device that provides a notice instructing to select one of the first travel mode and the second travel mode of the vehicle, wherein the control device predicts an amount of fuel consumption for the first travel mode and an amount of fuel consumption for the second travel mode according to the vehicle speed pattern predicted from the predicted travel path and the road information and compares the predicted amounts of fuel consumption to determine a difference between the predicted amounts of fuel consumption, and wherein the control device controls the alarm device to operate when a determination is made that it is preferable to switch between the first travel mode and the second travel mode.

* * * * *